United States Patent [19]

Hayes et al.

[11] Patent Number: 4,753,998
[45] Date of Patent: Jun. 28, 1988

[54] DIELS-ALDER ADDUCTS OF POLY(ALOOCIMENE)

[75] Inventors: Kathryn S. Hayes, Norristown, Pa.; Charles R. Frihart, Lawrenceville; Richard L. Veazey, East Windsor, both of N.J.

[73] Assignee: Union Camp Corporation, Wayne, N.J.

[21] Appl. No.: 880,671

[22] Filed: Jun. 30, 1986

[51] Int. Cl.[4] .................. C08F 281/00; C08F 265/10; C08F 267/04
[52] U.S. Cl. ..................................... 525/275; 525/282; 525/285; 525/293; 525/296; 525/300; 525/302; 525/304; 525/308
[58] Field of Search ............... 525/285, 275, 282, 293, 525/296, 300, 302, 304, 308

[56] References Cited

U.S. PATENT DOCUMENTS 4,382,128  7/1979  Yasui et al. ..................... 525/285
4,161,571  5/1983  Li ................................. 525/285

FOREIGN PATENT DOCUMENTS 55-01804  4/1980  Japan .

OTHER PUBLICATIONS

Chem. Abstracts vol. 97, 1982 Entry 128655N.

Primary Examiner—Joseph L. Schofer
Assistant Examiner—Peter F. Kulkosky
Attorney, Agent, or Firm—Edward J. Sites

[57] ABSTRACT

Unique Diels-Alder adducts of an activated olefin and an alloocimene polymer containing pendant conjugated double bonds were prepared. These adducts are useful as binders in adhesive, printing ink and coating formulations.

18 Claims, 1 Drawing Sheet

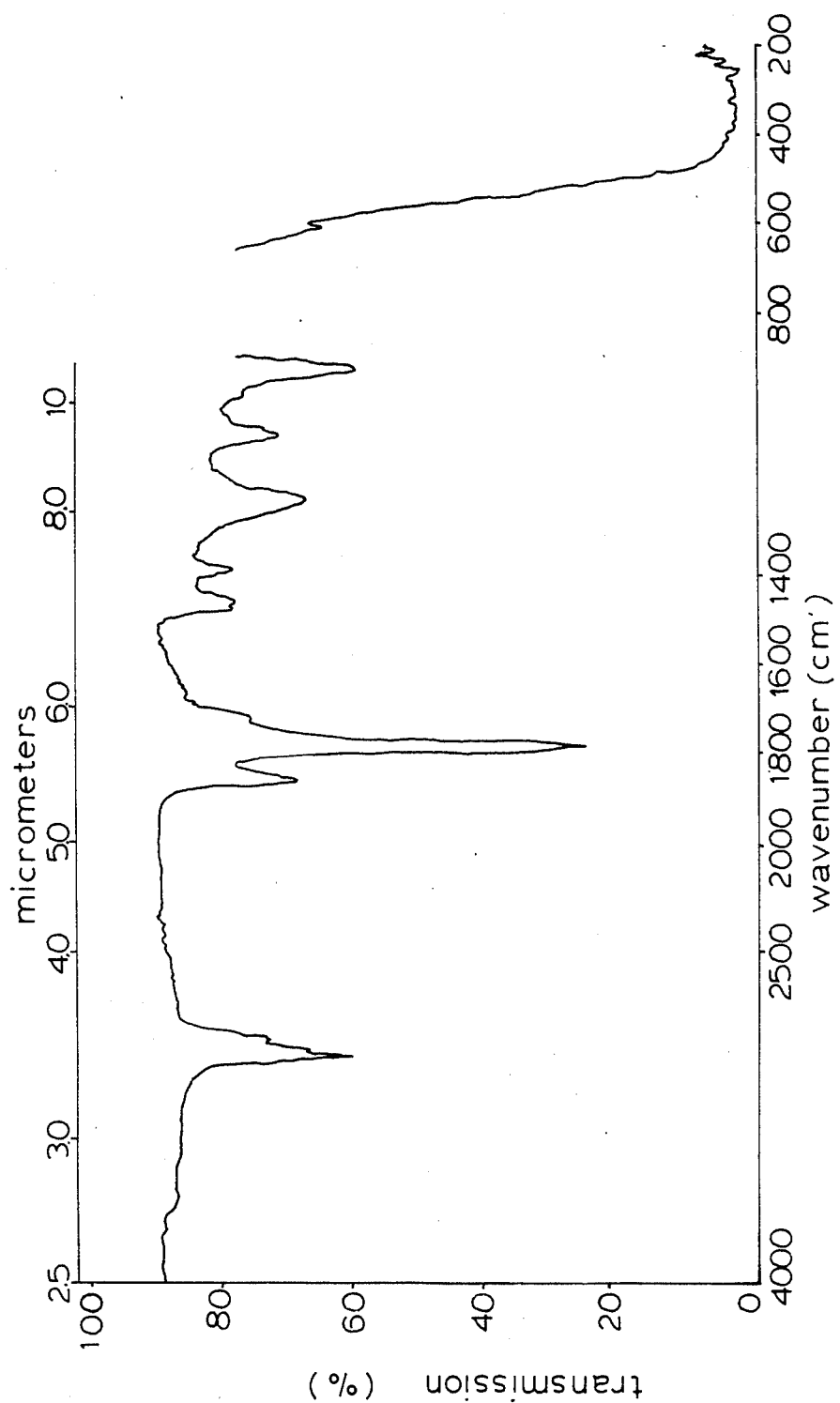

DIELS-ALDER ADDUCTS OF POLY(ALOOCIMENE)

BACKGROUND OF THE INVENTION

1. Field of the Invention

The invention relates to the Diels-Alder adducts of an activated olefin with a poly(alloocimene) containing conjugated double bonds in pendant side-chains.

2. Brief Description of the Prior Art

Derivatization of terpene polymers by reaction with activated olefins, especially alpha-beta unsaturated acids and anhydrides, e.g. maleic anhydride, is known. Representative are materials described in International Pat. No. WO 84/04533, Nov. 22, 1984 to SCM Corporation made from polyterpenes, especially poly(beta-pinene), obtained via cationic polymerizations. Because these terpene polymers contain little conjugated olefinic functionality, the dominant reaction they undergo is the Ene reaction. An elevated temperature (about 190° C.) is required for this reaction. The resultant material contains functionality attached directly to the polymer backbone.

Rummelsburg, who discusses Diels-Alder functionalization of terpene triene oligomers in U.S. Pat. No. 2,347,970, employs only substantially pure dimer because it is obtained in high yield simply by heating for example, alloocimene, with acid.

SUMMARY OF THE INVENTION

The invention comprises the Diels-Alder adduct of an activated olefin and a poly(alloocimene) having conjugated double bonds in pendant side chains.

The term "activated olefin" as used herein means an olefin substituted with an electron-withdrawing group.

The adducts of the invention are useful as binder resins in printing ink, coating and adhesive formulations.

BRIEF DESCRIPTION OF THE DRAWING

The drawing is of an infrared spectrum of an adduct of the invention prepared in accordance with the procedure of Example 1, infra.

DETAILED DESCRIPTION OF THE INVENTION

The compounds of the instant invention are adducts of alloocimene polymers which generally comprise mixtures of the chain units (VIII), (IX), and (X) given below. A majority, i.e.; greater than 50 percent of the residual unsaturation in the polymer is in the form of pendant, conjugated 3,4-dimethylbutadienyl and 4,4-dimethylbutadienyl side chains. A minority, i.e. less than 50 percent of the residual unsaturation in the polymer is in the form of pendant, 2-methylpropenyl side chains. We define 2,3- and 6,7-poly(alloocimene) as a polymer comprising greater than 50 weight percent of 2,3-poly(alloocimene), (VIII), and 6,7-poly(allooci-mene), (IX), and less than 50 weight percent of 4,7-poly(alloocimene), (X).

The compounds of the invention are polymers having recurring chain moieties of the formula:

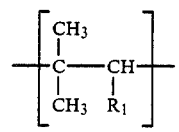

(I)

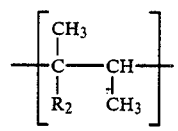

(II)

wherein $R_1$ is a monovalent group formed by the adduction of an activated olefin with the side-chain moiety of the formula:

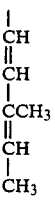

(III)

and $R_2$ is a monovalent group formed by the adduction of an activated olefin with the side-chain moiety of the formula:

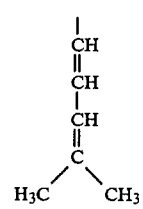

(IV)

As an illustration of the polymer compounds of the invention, when the activated olefin is maleic anhydride, the monovalent adduct group which may be $R_2$ will have the structural formula:

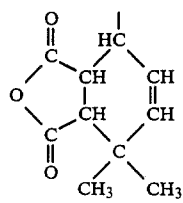

(V)

and the monovalent adduct group which may be $R_1$ will have the structural formula:

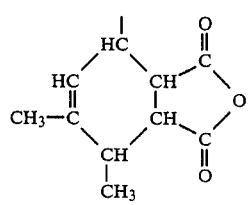

(VI)

The polymer compounds of the invention possess a wide variety of molecular weights. Representative molecular weights are in the range of from about 500 to about 100,000.

The adducts of the invention may be prepared by the Diels-Alder reaction of an activated olefin with a particular poly(alloocimene). The Diels-Alder reaction is well known; see for example Martin and Hill (*Chem. Revs.*, 1961, 61, 537); and Huisgen, The Chemistry of Alkenes, S. Patai, Editor, Chapter II, Part V, p. 878. In general, the reaction comprises the thermal or catalyzed addition of an activated olefin (the dienophile) to conjugated double bonds residing in 2,3- and 6,7-poly(alloocimene).

More specifically, the Diels-Alder reaction may be carried out by first charging the poly(alloocimene) in relatively pure or crude forms to a suitable reaction vessel with the dienophile. The mixture is stirred and heated to effect Diels-Alder adduction of the dienophile to the polymer. Adductions in the absence of catalyst may be carried out at temperatures of from about 25° C. to about 200° C., preferably from about 100° C. to about 150° C. under ambient pressures. Catalysts for the Diels-Alder reaction are well known and may be employed in catalytic proportions, i.e.; a presence of from about 0.001 to about 10 weight percent of the reaction mixture. Representative of catalysts which may be employed are aluminum and zinc compounds. In the presence of such catalysts the reaction temperature is normally from about 0° C. to about 100° C., preferably around room temperature and under ambient pressure.

The dienophile is an activated olefin, that is, an olefin substituted with an electron-withdrawing group or groups. Examples of such groups are carbonyl, nitrile, nitro, sulfoxide, sulfone, sulfonyl and halogen. Representative of olefin dienophiles are maleic anhydride, acrylic acid, methacrylic acid, crotonic acid, itaconic acid, fumaric acid, quinone, aryl and alkyl acrylates such as isobornyl acrylate, methyl acrylate, methacrylate and like acrylate and methacrylate esters, polyol acrylates and polyol polyacrylates such as butanediol diacrylate, trimethylolpropane triacrylate, glycerol triacrylate, pentaerythritol tetraacrylate and the like, acrolein, acrylonitrile, vinyl sulfone, methyl vinyl ketone, nitroethylene, tetracyanoethylene, dichloroethylene, trichloroethylene, tetrachloroethylene, maleonitrile, monoesters and diesters of maleic acid, monoesters and diesters of fumaric acid, amides and bisamines of maleic acid, amides and bisamines of fumaric acid, acetylenemonocarboxylic acids, acetylenedicarboxylic acids, monoesters and diesters of acetylenedicarboxylic acid, the like and maleiimides of the formula:

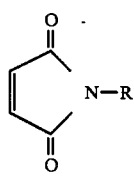

(VII)

wherein R is a monovalent group selected from alkyl and aryl. The term "alkyl" as used herein means the monovalent moiety obtained upon removal of a hydrogen atom from a parent hydrocarbon. Representative of alkyl are methyl, ethyl, propyl, butyl, pentyl, hexyl and isomeric forms thereof. The term "aryl" as used herein means phenyl, naphthyl and like groups.

The olefin dienophile may be added to the reaction mixture in any amount; preferably an amount equal to or slightly less than 100 mole percent of the amount of conjugated double bonds of the poly(alloocimene).

The Diels-Alder adduction is preferably carried out in the presence of an inert solvent. The term "inert solvent" is used herein to mean a solvent for the reactants which does not enter into or adversely affect the desired course of the reaction. Representative of inert solvents are toluene and xylene, which can dissolve both the polymer and the dienophile and which boil at the desired reaction temperature. In this case, the adduction is carried out simply by charging the solvent, polymer, and dienophile to the reaction vessel, and then heating to reflux temperature. Maintaining reflux temperature until adduction is complete, typically 1-30 hours depending on the solvent and the dienophile chosen, results in the desired adduct polymer of the invention. The completion of the adduction may be observed by conventional and periodic analyses of the reaction mixture. For example infrared analysis will show the appearance of spectra characteristic of the adduct polymers of the invention.

At the conclusion of the adduction reaction the desired product may be separated from the reaction mixture by conventional technique. For example, unreacted reagent and solvent may be separated by distillation.

The poly(alloocimene) employed to prepare the adduct polymers of the instant invention is the homopolymer of alloocimene having a weight average molecular weight of from about 500 to 100,000 and which contains repeating or recurring chain moieties of the formula:

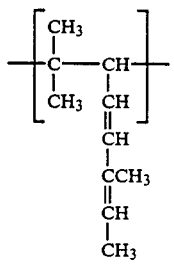

(VIII)

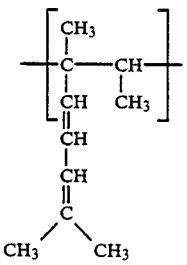

(IX)

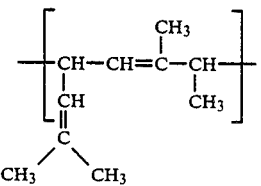

(X)

These poly(alloocimene) polymers comprise mixtures of a majority of chain moieties VIII and IX as a group and a minority of chain moiety X. We define the 2,3- and 6,7poly(alloocimene) as that composition consisting of greater than 50 weight percent 2,3-poly(alloocimene), (VIII), and 6,7-poly(alloocimene), (IX), and less than 50 weight percent of 4,7-poly(alloocimene), (X).

The 2,3- and 6,7-poly(alloocimene) used in the present invention as a starting material is prepared in the following manner: substantially anhydrous alloocimene is added slowly to an active metal catalyst dispersed in a substantially anhydrous ether diluent under an inert gas atmosphere. Controlled reaction by slow alloocimene addition is necessary because the polymerization is highly exothermic. It is preferred that the alloocimene feed be essentially free of peroxides, water, and alcohols. The active metal polymerization catalyst may be any alkali metal or calcium, substantially freed of surface oxides or other contaminants and being present at a concentration of less than about 10 mole percent of the alloocimene. The active metal catalyst may be present as spheres, wire, foil, or finely divided dispersion and may be in the pure state, as a mixture or an alloy, or as a solution with aromatic hydrocarbons, such as naphthalene, 2-methylnaphthalene, and the like.

The ether diluents used in this preparation as agents to favorably influence the polymerization are the aliphatic and cycloaliphatic ethers. The ethers are preferred in amounts of greater than about 5 weight percent of the alloocimene. The diluents most preferred are tetrahydrofuran and 1,2-dimethoxyethane. Other inert hydrocarbon solvents and diluents may be present, for example, benzene, toluene, xylene, ethylbenzene, pentane, hexane, cyclohexane, heptane, octane, nonane, limonene, p-cymene, and the like, or mixtures thereof.

The polymerizations are carried out at temperatures of from about $-78°$ C. to about $100°$ C., with reaction times of from about 10 minutes to about 500 hours. Most preferably the polymerizations are carried out at temperatures of from about $-30°$ C. to about $60°$ C., with reaction times of from about 1 to about 8 hours.

When polymerization is complete, addition of a proton source, for example, water, an acid, an alcohol, or mixtures thereof, in molar excess of the alkali metal catalysts terminates the reaction and thereby introduces hydrogen atoms at the end or ends of the polymeric chain.

Following the polymerization, the reaction mixture containing the poly(alloocimene) is subjected to distillation in order to remove the ether solvent, unreacted terpenes, any other diluents, and any excess of added termination reagent. Care must be taken not to exceed a temperature of about $150°$ C. in the distillation pot containing the polymer, otherwise excessive thermal degradation of the polymer will occur. The polymer may be discharged while still molten onto a Teflon® coated glass fabric or other suitable surface and allowed to cool. The cooled polymer may then be packaged under a nitrogen atmosphere to protect it from oxidation.

A second polymer isolation procedure, although not requisite, may be employed especially for higher molecular weight poly(alloocimene). This method involves cautious transfer of the terminally active polymer and diluents into a large excess of a nonsolvent, such as methanol, or the like. The poly(alloocimene) precipitates as a white solid. Collecting, redissolving, and re-precipitating the poly(alloocimene) solid several times gives, after finally drying, a poly(alloocimene) free of low molecular weight impurities. The dried, isolated poly(alloocimene) is then packaged and stored in a nitrogen atmosphere.

It is advantageous to add an antioxidant, such as 2,6-di-tert-butyl-4-methylphenol or the like, prior to distillative isolation, or in the final precipitation solvent to protect the poly(alloocimene) from oxidizing.

Alternatively, the poly(alloocimene) need not be isolated but the reaction mixture containing the polymer may be used directly for the Diels-Alder reaction to prepare the adducts of the invention.

The adducts of the present invention can be subjected to further chemical transformations of interest is obvious to those skilled in the art. For example, the adduct of poly(alloocimene) and maleic anhydride is an active polyanhydride which reacts with alcohols to give new materials containing pendent half-ester groups. These materials dissolve or disperse in water in the presence of amines or alkali to give aqueous coatings adhesive or ink formulations.

The polyanhydride reacts with amines to give new materials containing pendent half-amide groups or imides. Other examples of further reactions of adducts are the reductions of the poly(alloocimene) adducts of acrolein and acrylonitrile to new materials containing pendent alcohol and amine groups respectively.

The following examples describe the manner and the process of making and using the invention and set forth the best mode contemplated by the inventors for carrying out the invention.

Preparation 1

To a clean, oven-dried, four neck round-bottomed flask, equipped with a thermometer, nitrogen inlet, pressure equalizing addition funnel, a reflux condensor into which was inserted an inert gas exit adapter, and a Nicrome wire stirrer, was added sodium shot (46 g) and toluene (300 ml) which had been dried and distilled from calcium hydride. A nitrogen blanket was maintained in the reaction flask at all times. Heat was applied and stirring initiated. The toluene was allowed to gently reflux for 30 minutes, and then it is cooled. At this point tetrahydrofuran (250 ml) was added. A preweighed sample of the alloocimene (1242 g, 44.5% true) which had been dried over calcium hydride and distilled, was charged to the addition funnel. The polymerization temperature of $60°$ C. was maintained by applying heat with a heating mantle attached to a temperature sensing device. Polymerization was initiated by slowly adding the alloocimene mixture over one hour to the stirred solvent containing sodium metal. After 4.5 hours, the polymerization was complete and the poly(alloocimene) was isolated by transferring the polymer solution into a separatory funnel containing methanol. After deactivation of the catalyst, water and toluene were added, and the polymer solution was thoroughly washed with water. The organic solution was then dried over anhydrous magnesium sulfate and filtered into a round-bottom flask. The solvent(s) was removed at reduced pressures. Any monoterpenes were isolated at approximately $65°$ C. (5 to 20 mm Hg.). The distillation was terminated when the temperature in the pot containing the polymer product reached about $150°$ C. The polymer was poured while hot into a pan, allowed to cool, then stored under nitrogen. The polymer yield was 402 g, about 73% of theory. It had a glass transition temperature of $-15°$ C. and a weight average molecular weight of 1480.

Preparation 2

Poly(alloocimene) was prepared according to the procedure of Preparation 1 but with a polymerization temperature of 25° C. This polymer had a glass transition temperature of about 1° C. and a weight average molecular weight of 6,000.

EXAMPLE 1

Poly(alloocimene) prepared by the procedure of Preparation 1, supra., (10 g, 0.074 moles of terpene units) and maleic anhydride (7.25 g, 0.074 moles) was charged to a reaction flask and heated at 140° C. for 3 hours. A small amount of unreacted maleic anhydride was removed by distillation under vacuum. The product yield was 90% theory. The adduct resin had a glass transition temperature of 66° C., a softening point of 124° to 135° C., and a saponification number of 307 (theory for complete adduction of all terpene units is 481, indicating about 64% adduction efficiency). The infrared spectrum (see the drawing) clearly exhibited characteristic anhydride bond vibrations at 1785 and 1860 cm$^{-1}$.

EXAMPLE 2

The procedure of Example 1, supra., was followed, replacing the maleic anhydride as used therein with an equal proportion of acrylic acid. The product yield was 91% of theory. The adduct glass transition temperature was −5° C., softening point was 86°–89° C. and acid number 179 (270 is the theoretical value of 100% adduction of a polymer with 100% conjugated diene functionality). The product infrared exhibited a strong carboxylic acid band at 1710 cm$^{-1}$ and acid —OH band from 3000–3500 cm$^{-1}$.

EXAMPLE 3

The procedure of Example 1 was followed, replacing the maleic anhydride with an equal proportion of acrylamide. The adduct yield was 60% and the product glass transition temperature was −27° C. The infrared showed a moderate and broad amide carbonyl band centered at 1675 cm$^{-1}$ and a broad NH band centered at about 3400 cm$^{-1}$.

EXAMPLE 4

The procedure of Example 1 was followed except that the maleic anhydride as used therein was replaced with an equal proportion of methyl acrylate, and the reactor was a stainless steel pressure vessel. Mixed xylenes were used as the solvent. The adduct (obtained in 62% yield after removal of solvent and any unreacted acrylate) had a glass transition temperature of −18° C. and a saponification number of 132 (theory is 252) indicating about a 52% adduction efficiency. Its infrared spectrum exhibited a strong ester band at 1745 cm$^{-1}$. The NMR spectrum showed a large peak at 3.6 ppm for the ester —OCH$_3$ group.

EXAMPLE 5

Aluminum chloride (5.06 g) was added to a 100 ml round bottomed flask in a dry box. Dry toluene (10 ml) was added followed by 10 g (0.074 mole) of polymerized alloocimene of Preparation 1, supra., and 6.54 g (0.074 mole) of methyl acrylate. The mixture was stirred for 6 hours at room temperature and then was slowly poured into ice water. The layers were separated, and the aqueous layer was extracted with toluene. Toluene was removed from the combined organic layers by distillation. The adduct yield was 73%. Its infrared spectrum was identical to that of the adduct from Example 4, supra.

EXAMPLE 6

To 10 g of the polymer prepared in Preparation 2, supra., (0.074 moles of terpene units) was added maleic anhydride (3.6 g, 0.037 moles). This mixture was heated at 140° C. for 3 hours. The product adduct had a softening point of 95°–102° C., a saponification number of 252 (theory is 305), and a glass transition temperature of 44° C.

EXAMPLE 7

To 10 g (0.074 moles of terpene units) of the poly(alloocimene) prepared in Preparation 2, supra., was added acrylic acid (2.64 g, 0.037 moles). The mixture was heated to 140° C. for 3 hours. The product adduct had a glass transition temperature of −8° C., a melting range of 79°–84° C., and a saponification number of 176 (theoretical for 0.037 moles is 164).

EXAMPLE 8

A reaction flask was charged with 10.2 g of poly(alloocimene) prepared as in Preparation 2, supra. (0.075 moles of terpene units), 4.64 g of trimethylolpropane triacrylate (a product of Arco, Sartomer Division, 0.034 moles) and mixed xylenes solvent (10 ml). This mixture was stirred and heated to reflux. After 0.5 hours at reflux, the solution began to thicken. The solution was heated (refluxed) for 1 hour, 40 minutes, then cooled to room temperature. The product was examined and then refluxed for an additional 1 hour, 15 minutes. The product was cooled to room temperature. The solvent was removed by vacuum distillation. Methanol was added to the distillation residue to dissolve any unreacted TMP triacrylate. The mixture was stirred, and the product was filtered and dried. The product adduct was insoluble in THF and had a glass transition temperature of 55.5° C.

What is claimed is:

1. The Diels-Alder adduct of a Diels-Alder olefin dienophile and a poly(alloocimene) having a molecular weight of at least 500 comprised of a mixture of greater than 50 weight percent of 2,3poly(alloocimene)-and 6,7-poly(alloocimene) and less than 50 weight percent of 4,7-poly(alloocimene) and wherein the Diels-Alder addition is exclusively on the side chains at the position of conjugated ethylenic unsaturation of the 2,3poly(alloocimene)- and 6,7-poly(alloocimene) chain moieties.

2. The adduct of claim 1 wherein the olefin is selected from the group consisting of acrylic acid, methacrylic acid, crotonic acid, itaconic acid, fumaric acid, acetylenemonocarboxylic acid and acetylene dicarboxylic acid.

3. The adduct of claim 1 wherein the olefin is selected from the group consisting of aryl acrylates, alkyl acrylates, methyl acrylate, methyl methacrylate and isobornyl acrylate.

4. The adduct of claim 1 wherein the olefin is selected from the group consisting of butanediol diacrylate, trimethylopropane triacrylate, glycerol triacrylate and pentaerythritol tetraacrylate.

5. The adduct of claim 1 wherein the olefin is maleic anhydride.

6. The adduct of claim 1 wherein the olefin is acrylamide.

7. The adduct of claim 1 wherein the olefin is acrylonitrile.

8. The adduct of claim 1 wherein the olefin is acrolein.

9. The adduct of claim 1 wherein the olefin is quinone.

10. The adduct of claim 1 wherein the olefin is naphthoquinone.

11. The adduct of claim 1 wherein the olefin is methyl vinyl ketone.

12. The adduct of claim 1 wherein the olefin is selected from the group consisting of maleonitrile and fumaronitrile.

13. The adduct of claim 1 wherein the olefin is selected from the group consisting of a monoester and a diester of maleic acid.

14. The adduct of claim 1 wherein the olefin is selected from the group consisting of a monoester and a diester of fumaric acid.

15. The adduct of claim 1 wherein the olefin is selected from the group consisting of an amide and a bisamide of maleic acid.

16. The adduct of claim 1 wherein the olefin is selected from the group consisting of an amide and a bisamide of fumaric acid.

17. The adduct of claim 1 wherein the olefin is a diester of acetylenedicarboxylic acid.

18. The adduct of claim 1 wherein the olefin is a maleiimide of the formula:

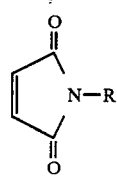

wherein R represents a monovalent group selected from alkyl and aryl.